J. J. WATTS.
TOOTH.
APPLICATION FILED JULY 26, 1913.
1,188,708.
Patented June 27, 1916.
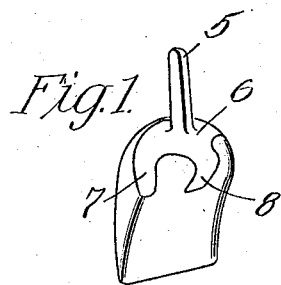
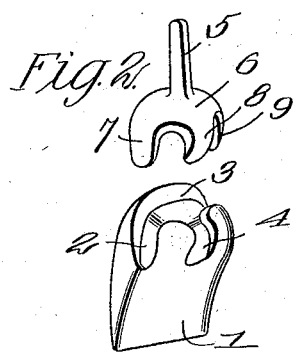
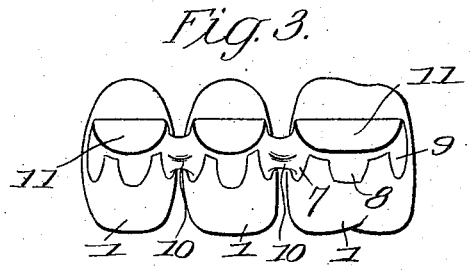
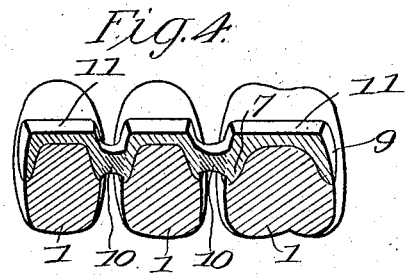
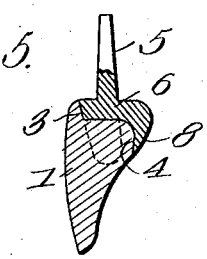
WITNESSES
INVENTOR
JOE J. WATTS
BY
ATTORNEYS

UNITED STATES PATENT OFFICE.

JOE JOHNSON WATTS, OF NATCHEZ, MISSISSIPPI.

TOOTH.

1,188,708.   Specification of Letters Patent.   Patented June 27, 1916.

Application filed July 26, 1913. Serial No. 781,374.

*To all whom it may concern:*

Be it known that I, JOE JOHNSON WATTS, a citizen of the United States, and a resident of Natchez, in the county of Adams and State of Mississippi, have invented certain Improvements in Teeth, of which the following is a specification.

My invention is an improvement in teeth, and has for its object the provision of a tooth comprising a body and a separable backing, the body and backing having interengaging means for attaching the body to the backing, in order that when the tooth has been once placed, the bodies may be interchangeable.

In the drawings:—Figure 1 is a perspective view of a tooth and its backing connected, Fig. 2 is a similar view with the tooth and backing separated, Fig. 3 is a perspective view from below and behind of a bridge, Fig. 4 is a similar view, the teeth and the backing being in section, and Fig. 5 is a vertical section of a single tooth.

In the present embodiment of the invention, interchangeable bodies are provided, which may be supplied in the usual manner by the dental supply houses in series or lots, according to color and character.

Each of the said bodies 1 (Figs. 1 and 2) is provided on the end adjacent to the gum with a recess or cut, the said cut or recess consisting of a channel that begins at the inner side of the tooth as shown at 2, passes over the end of the tooth adjacent to the gum as shown at 3 and ends at a point directly opposite its beginning. A cut 4 is provided leading from the center of the first-named cut, the said cut 4 extending on the inner face of the tooth to the level of the ends of the first-named cut. The backing consists of a stem 5 for engaging the root cavity, and a head 6 having three claws for engaging the cuts 2, 3, 4. The arrangement is such that when the head is slipped into place as shown in Fig. 1, the claws 7, 8 and 9 will engage the portions 2, 3, 4 of the body, the head 6 engaging the portion 3 of the cut.

In placing the improved teeth, the backings are set up with the teeth in position as to occlusion and base line. The teeth are then removed from the backings, leaving the backings in position, and stuck to the gum line with wax. A good investment compound for crown or bridge work is then poured on to the backing to hold them. Afterward the gum line is cut away, leaving that part of the backing adjacent to the gum exposed, so that gold solder can be flowed into the space that is left between the backings as shown at 10 in Figs. 3 and 4 and on to the abutment.

Whether a gold crown is used, or a gold inlay, there will be no gold to show, and in case of an accident, the tooth body may be removed from the backing and replaced by another. The three claws engaging the three cuts prevent any change of position in the body of the tooth.

In bridge work, the backing shown in Figs. 3 and 4 are made use of, the stem or spur 5 being omitted, leaving thus a flat surface 11.

I claim:—

A tooth comprising a facing and a separable backing, said facing having in its gingival end a recess extending from near the buccal to the lingual side of the tooth, and leaving a wall between the recess and the buccal side of the tooth to hide the recess, said recess having branches extending toward the incisal end of the tooth, the said branches being three in number, and at the rear of the tooth and at the opposite sides thereof and leaving a portion of the tooth at the sides in front of the branches and hiding the said branches, and a backing fitting the recess and having extensions engaging and fitting the three branches, the walls of the recess and the branches being approximately parallel to permit the ready removal of the body.

JOE JOHNSON WATTS.

Witnesses:
WILLIAM DORE,
HENRY W. GILMORE.

Copies of this patent may be obtained for five cents each, by addressing the "Commissioner of Patents, Washington, D. C."